Jan. 6, 1959
A. E. BURR
2,867,308
SINGLE PEDAL CONTROL FOR AUTOMOBILES
Filed Dec. 15, 1955
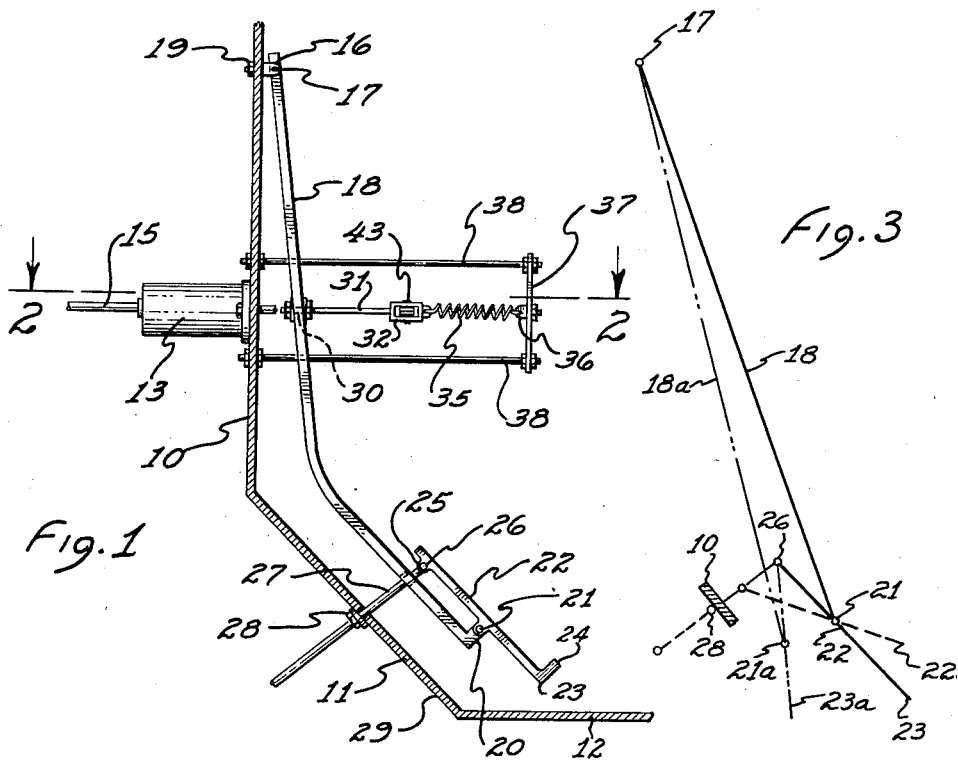
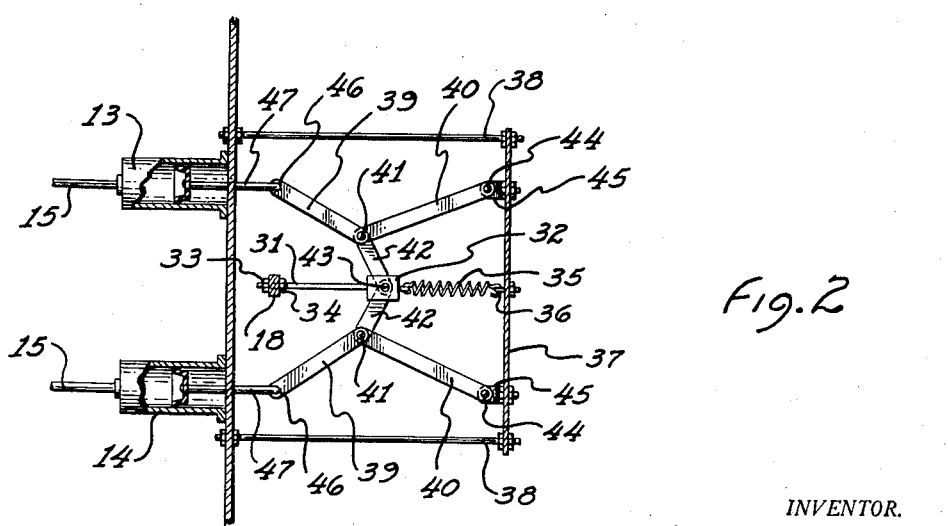
INVENTOR.
ALFRED E. BURR.
BY
Willard S. Groves
ATTORNEY.

United States Patent Office 2,867,308
Patented Jan. 6, 1959

2,867,308

SINGLE PEDAL CONTROL FOR AUTOMOBILES

Alfred E. Burr, Phoenix, Ariz.

Application December 15, 1955, Serial No. 553,363

3 Claims. (Cl. 192—3)

This invention pertains to improvements in single pedal control for automobiles in which the fuel feeding and braking of the automobile are controlled from a single control pedal.

One of the objects of this invention is to provide an improved single pedal control for an automobile which has a nicety of control and feed to improve the safety and punctuality with which the braking and fuel feeding may be controlled by the operator of the vehicle.

Still another object of this invention is to provide an improved single pedal control for automobiles which is highly efficient in operation and has a minimum of pedal travel while at the same time can instantly control the fuel feeding and braking of the vehicle both independently and simultaneously from the single manipulation of the one pedal of the control mechanism.

Still another object of this invention is to provide an improved and simplified structure combining the braking and accelerator feed mechanism of the automobile and bring it under single pedal control for both independent and simultaneous manipulation thereof.

Further features and advantages of this invention will appear from a detailed description of the drawings in which:

Fig. 1 is an enlarged fragmentary vertical section through the apparatus incorporating the features of this invention.

Fig. 2 is a section on the line 2—2 of Fig. 1.

Fig. 3 is a diagram showing the linkage geometry of the device.

As an example of one embodiment of this invention there is shown a frame portion of a motor vehicle comprising the fire wall 10, the footboard portion 11 and the floor 12 of the motor vehicle body. In this arrangement there are provided two hydraulic brake master cylinders 13 and 14, one of which is connected to the rear wheel brakes while the other is preferably connected to the front wheel brakes. Each of these master cylinders 13 and 14 are securely bolted to the fire wall 10 and connected by suitable lines 15 to the respective hydraulic wheel brakes recited.

Suitably mounted on a lug 16 by the pin 17 is the main operating arm 18, the lug 16 being rigidly secured by the nut 19 to the fire wall 10 of the vehicle body. On the lower end of the main operating arm 18 is a turned up portion 20 carrying a pivot pin 21 upon which is pivotally mounted the accelerator-brake pedal 22, the pivot at 21 on this pedal 22 being located intermediate the ends of the pedal 22. The lower outer free end 23 of the pedal 22 has a turned up heel stop 24 while the other outer end of the pedal 22 has a lug 25 carrying a pivot pin 26 connected to the carburetor actuating rod 27, which rod in turn extends through the floor board portion 11 and is connected in the usual manner to the carburetor of the vehicle. A stop nut 28 is carried on the rod 27 so as to limit the return movement of the carburetor rod by engagement with the inner face 29 of the footboard portion 11 to the normally closed idling position of the engine of the motor vehicle.

Intermediate the ends of the main operating arm 18 is formed a transverse diametrically disposed bore 30 through which passes the stem 31 of the eyebolt 32 but which stem 31 is adjustably restricted in movement in the bore 30 by suitable stop nuts 33 and 34. A tension spring 35 is interconnected between the eyebolt 32 and the lug 36 fixed in the support plate 37 rigidly mounted by the studs 38 on the fire wall 10 of the motor vehicle so as to normally pull the main operating arm 18 to released position, to the right in Fig. 1. Pairs of toggle links 39 and 40 are pivotally connected at 41 to the links 42 which in turn are pivotally connected at 43 to the eyebolt 32. The outer ends of the toggle links 40 are pivotally connected at 44 to suitable adjustable eyebolts 45 rigidly fixed to the support plate 37 while the outer ends of the toggle links 39 are pivotally connected at 46 to the usual piston rods 47 of the master cylinders 13 and 14.

In operation if the operator of the motor vehicle places his foot on the accelerator-brake pedal 22 and presses the toe portion of his foot to depress the upper outer end of the pedal 22 to position 22a, Fig. 3, the throttle rod 27 will be moved inwardly to open the throttle and cause acceleration of the vehicle while the tension spring 35 maintains the main operating arm 18 in its outward position shown in Fig. 1 with the brakes released. If, however, the operator applies pressure at the heel portion of his foot the throttle will be automatically closed by withdrawal of the rod 27 until the stop nut 28 arrests its further closing movement whereupon the main operating arm 18 will then be swung inwardly to position 18a, Fig. 3, to move the stem 31 and eyebolt 32 inwardly flattening the toggle links 42—42 which in turn straighten out the toggle links 39—40 to their more dead center position thus applying the braking pressure to the master cylinders 13 and 14 with increasing and positive smooth acting pressure. It should also be noted that at this time the heel portion of the lower outer free end 23 of the pedal 22 swings downwardly and inwardly to position 23a, Fig. 3, giving the additional travel and leverage by greater speed and distance of travel than the pivotal connection 21 moving to position 21a for forceably moving the main operating arm 18 toward braking position 18a. Thus there is a double set of toggle action with links 42—42 and 39—40 thus the leverage effect of 23—23a relative to 21—21a between the point of pivot 21 of the pedal 22 and the lower outer free end of the heel portion 24 thereof making for a minimum of brake arm 18 travel while at the same time providing a maximum of power and control upon movement of the foot pedal 22. At any time, however, the operator may again depress the toe portion to position 22a of the pedal even with the main operating arm depressed to braking position, a condition most desirable when starting on hills where back roll of the vehicle is to be prevented. Thus a highly efficient single pedal control for the accelerator and braking function to the motor vehicle has been provided.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A single pedal control for an automobile having, a frame portion, a carburetor, a downwardly extending main operating arm, means for pivotally supporting the upper end of said arm on said frame portion, and a brake operating device connected to be actuated by the movement of said arm, an accelerator-brake pedal having an upper toe portion and a lower heel portion, means intermediate said heel and toe portions of said pedal for freely pivotally mounting said pedal on the lower end of said arm, a carburetor control rod, means for connecting said rod to the upper toe end of said pedal so that toe pressure exerted on the toe end of said pedal actuates the carburetor of the automobile to accelerate the movement thereof, and stop means on said control rod adapted to engage said frame portion to arrest return movement of said rod at idling position of the carburetor of the vehicle providing the sole means to limit free pivotal movement of said pedal so that application of pressure to the heel portion of said pedal while the toe end of said pedal is held by said stop causes movement of said arm to apply the brakes of said automobile.

2. A single pedal control for an automobile having, a frame portion, a carburetor, wheel brakes, a main operating arm movably supported on said frame portion, brake operating means for said wheel brakes connected to be actuated by the movement of said arm, a pedal having heel and toe portions, means on said pedal located intermediate said heel and toe portions thereof for freely movably mounting said pedal on said arm, a control rod interconnected between said carburetor and the toe end of said pedal arranged so that toe pressure on said pedal moves said rod to actuate said carburetor to accelerate said automobile, and a stop means in said rod engaging said frame portion when said rod is returned to idling position of said carburetor arranged to provide the sole means to limit the free movement of said pedal to cause said arm to be moved toward brake application position when heel pressure is applied to said pedal while the toe end of said pedal is held by said stop.

3. In a single pedal control for an automobile as set forth in claim 2 wherein the toe end of said pedal remains in said fixed position during the application of heel pressure to said pedal while the heel portion moves at greater speed and travels further than the connection between said pedal and said arm when applying and releasing the wheel brakes of the automobile.

References Cited in the file of this patent
UNITED STATES PATENTS

| | | |
|---|---|---|
| 2,076,965 | Sawtelle | Apr. 13, 1937 |
| 2,203,777 | Detmers | June 11, 1940 |
| 2,244,116 | Polonec | June 3, 1941 |